(12) United States Patent
Barnett

(10) Patent No.: US 6,738,950 B1
(45) Date of Patent: May 18, 2004

(54) METHOD AND SYSTEM FOR DYNAMIC GENERATION OF WEB SITE CONTENT FOR SPECIFIC USER COMMUNITIES FROM A SINGLE CONTENT BASE

(75) Inventor: Richard Barnett, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/527,387

(22) Filed: Mar. 16, 2000

(51) Int. Cl.[7] .............................................. G06F 17/00
(52) U.S. Cl. ........................................ 715/513; 707/10
(58) Field of Search .................. 715/513, 530, 715/501.1; 707/1, 6, 10, 102, 103; 709/217, 218

(56) References Cited

U.S. PATENT DOCUMENTS 6,026,433 A * 2/2000 D'Arlach et al. ........... 709/217
6,219,680 B1 * 4/2001 Bernardo et al. ......... 715/501.1
6,247,032 B1 * 6/2001 Bernardo et al. ........... 715/530
6,263,352 B1 * 7/2001 Cohen ........................ 715/513
6,308,188 B1 * 10/2001 Bernardo et al. ........... 715/530
6,529,910 B1 * 3/2003 Fleskes ........................ 707/10
6,546,389 B1 * 4/2003 Agrawal et al. ............... 707/6
6,546,397 B1 * 4/2003 Rempell ..................... 707/102
6,560,639 B1 * 5/2003 Dan et al. ................... 709/218
6,601,057 B1 * 7/2003 Underwood et al. ........... 707/1

* cited by examiner

*Primary Examiner*—Sanjiv Shah

(57) ABSTRACT

What is described is a system for generating a web site. The system and method consists of a web server to service HTTP requests received from users and a database connected to the web server. The database determines which particular user community the requesting user is assigned to. A dataset of stored branch description files describes particular web site structures to be used for each of the user communities.

15 Claims, 3 Drawing Sheets

METHOD AND SYSTEM FOR DYNAMIC GENERATION OF WEB SITE CONTENT FOR SPECIFIC USER COMMUNITIES FROM A SINGLE CONTENT BASE

TECHNICAL FIELD

This invention relates to generating a customized web site. In particular, the invention relates to methods and systems for generating customized web sites for end users based upon grouping of users into user communities of similar interests, background, or other grouping characteristics.

BACKGROUND ART

The Internet and its related technologies have made large stores of information available to nearly anyone in the last few years. Various methods have been employed to present that information to its intended audience in the most convenient and efficient ways possible.

Some information, however, may be intended for a very specific audience, or community of end users of that information, and not intended for others. Providers of such information often wish to segregate such information from other users for which the information is not intended. Various means have been employed for segregating content, including the use of user authentication procedures to determine whether a user has been permitted access to the information.

However, existing means presently do not provide the capability to seamlessly provide several different levels or groupings of content access utilizing a single base of content. In some efforts to provide such groupings of content, users are still confronted with links to material they do not have access to, even though they may have been permitted access to the overall web site containing that content. The present invention seeks to solve this and others problems in the field.

SUMMARY OF INVENTION

In one respect, what is described is a system for generating a web site. The system comprises a web server to service HTTP requests received from users. A database is connected to the web server, where the database determines which particular user community the requesting user is assigned to. A dataset of stored branch description files describes particular web site structures to be used for each of the user communities.

In another respect, what is described is a method for generating a web site. The method comprises the steps of accepting a HTTP request from a requesting user, directing a web server to prompt the requesting user to submit a username and a password, performing a lookup of the username in a database of user communities and usernames assigned to each user community and selecting a branch description file specific to the user community to which the requesting user is assigned.

In yet another respect, what is described is a computer readable medium on which is embedded a program. The embedded program comprises components that execute the above method.

Those skilled in the art will appreciate these and other advantages and benefits of various embodiments of the invention upon reading the following detailed description of a preferred embodiment with reference to the below-listed drawings.

DETAILED DESCRIPTION OF A PREFERRED EMBODIMENT

Figure 1:
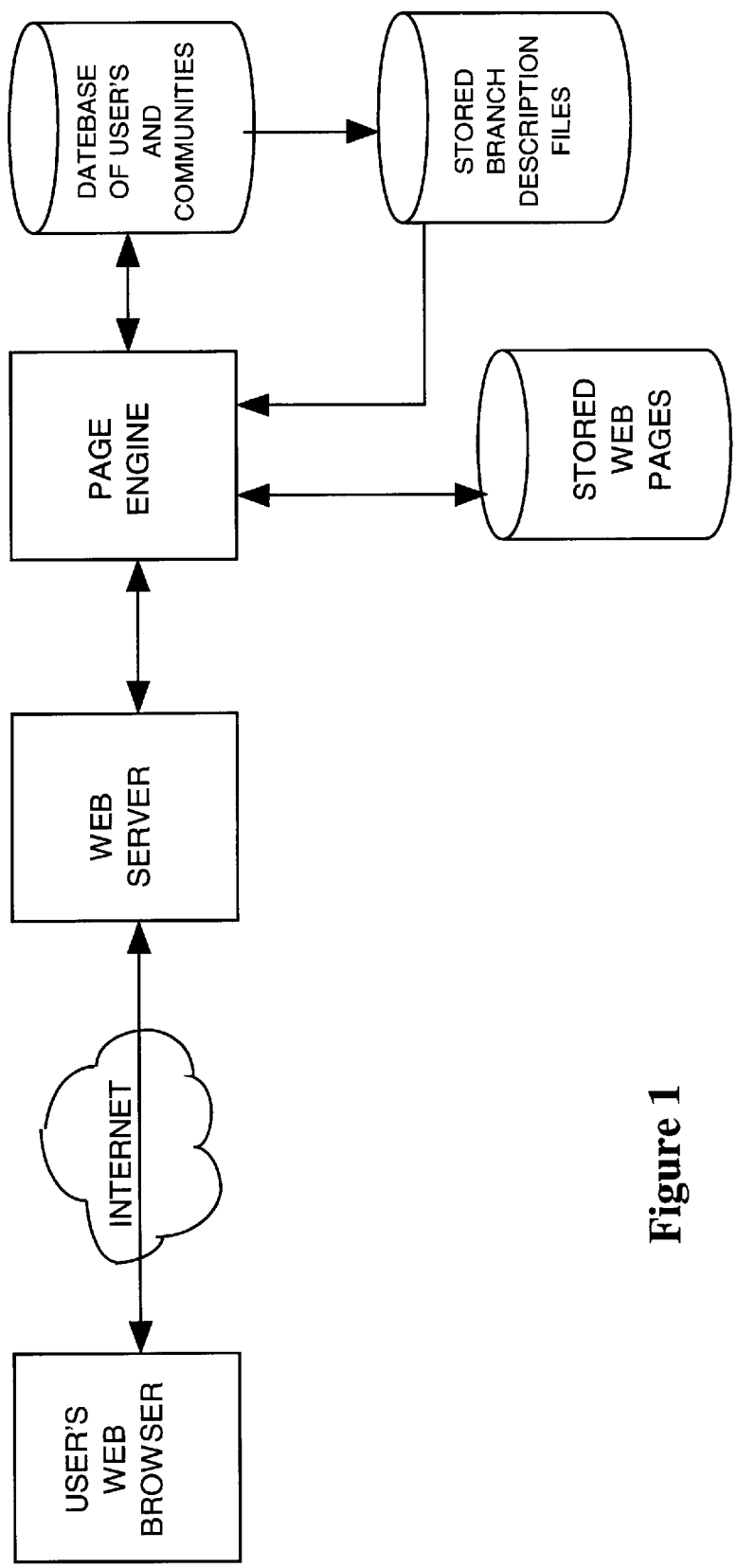
FIG. 1 is a block diagram of one embodiment of a system for generating a customized web site for an end user.

FIG. 1 is a block diagram of an embodiment of the present invention showing a system 100 for generating a customized web site for an end user based upon an assignment of the end user to a particular community of like users. A user community, as the term is used herein, is a grouping of end users each having certain similar characteristics, such as geographic location, age, gender, corporate department, language, and so forth. The present invention enables a single web server storing a predefined collection of web page content to generate and transmit to end users differing web sites based upon which of a set of predefined user communities the particular end user accessing the web server belongs to.

A particular end user ("user") operating a web browser 110 connects to a web server 130 over the Internet 120. The web browser sends an HTTP request to the web server 130. The web server 130 requests the user to submit a username and password. After the web server 130 has verified that the user is authorized to access the web server 130, the web server 130 connects to the page engine 135. The page engine 135 then generates a particular subset of web pages to be transmitted to the user's web browser 110 from among a set of stored web pages 150. In order to generate the subset of web pages for the user, the page engine 135 connects to a database 140 of end users and user communities against which the username and password is checked to determine the user's particular access privileges on the web server 130.

The database 140 is further connected to a dataset of stored branch description files 145, wherein each branch description file corresponds to a specific user community. Each branch description file describes the subset of web pages that a particular user community or user will have available for transmission to their web browser 110.

The dataset of stored branch description files 145 are connected to the page engine 135. The dataset of stored branch description files 145 pass web page generation instructions to the page engine 135 from a particular branch description file associated with a particular user community to which the user belongs. The page engine 135 also connects to the stored web pages 150 and selects the appropriate subset of web pages to be sent to the particular end user based on the instructions contained in the branch description file associated with that particular user's assigned user community. This enables the page engine 135 to generate a customized web page (and the associated web site structure) for the web server 130 to send back over the Internet 120 to the user's web browser 110.

Figure 2:
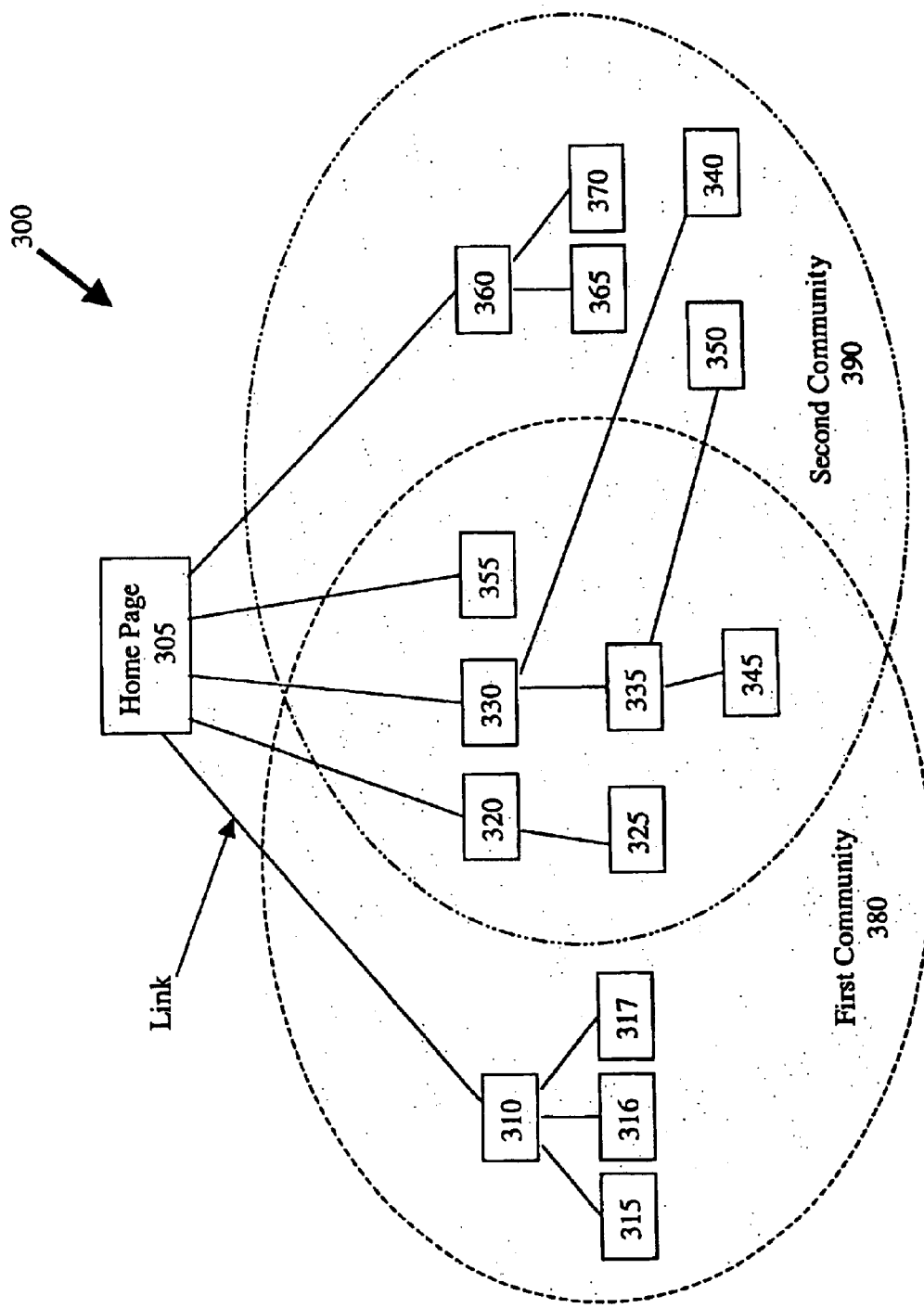
FIG. 2 is a flowchart illustrating a relationship between a stored web site structure and those portions accessible by specific user communities.

FIG. 2 is a flowchart of an example web site structure illustrating the relationship between an overall, pre-existing web site drawn from a dataset of web page content 300, and the portions accessible by particular user communities. In this example just two user communities are illustrated, but any number of user communities may be defined. The predefined user communities in this example are a first user community 380 and a second user community 390, each with their associated branch description files stored in the stored branch description files 145.

The overall web site structure is thus shown beginning at the top with a basic home page 305 containing the basic web page content that will go onto the first page, or "home page," that each particular user will see when first accessing the web server 130. The basic home page 305 can be linked to several top level pages 310, 320, 330, 355, and 360. Users assigned to the first user community 380 will, however, only see links to top level pages 310, 320, 330, and 355. Users assigned to the second user community 390 will only see links to top level pages 320, 330, 355, and 360.

Similarly, each top level page is linked to a certain number of next level pages 315, 316, 317, 325, 335, 340, 365, and 370. The first user community will only see links to next level pages 315, 316, 317, 325, and 335, where the next level pages 315, 316, and 317 are linked to top level page 310, next level page 325 is linked to top level page 320, and next level page 335 is linked to top level page 330. The second user community will likewise only see links to next level pages 325, 335, 340, 365, and 370, where next level page 325 is linked to top level page 320, next level pages 335 and 340 are linked to top level page 330, and next level pages 365 and 370 are linked to top level page 360.

Taking this concept one level further, there are two lower level pages 345 and 350 that can be linked to next level page 335. The second user community 390 can see links to both of those while the first user community 380 can only see a link to lower level page 345. As such, the first user community 380 and the second user community 390 are capable of receiving and viewing overlapping subsets of the whole pre-existing web page content 300.

Figure 3:
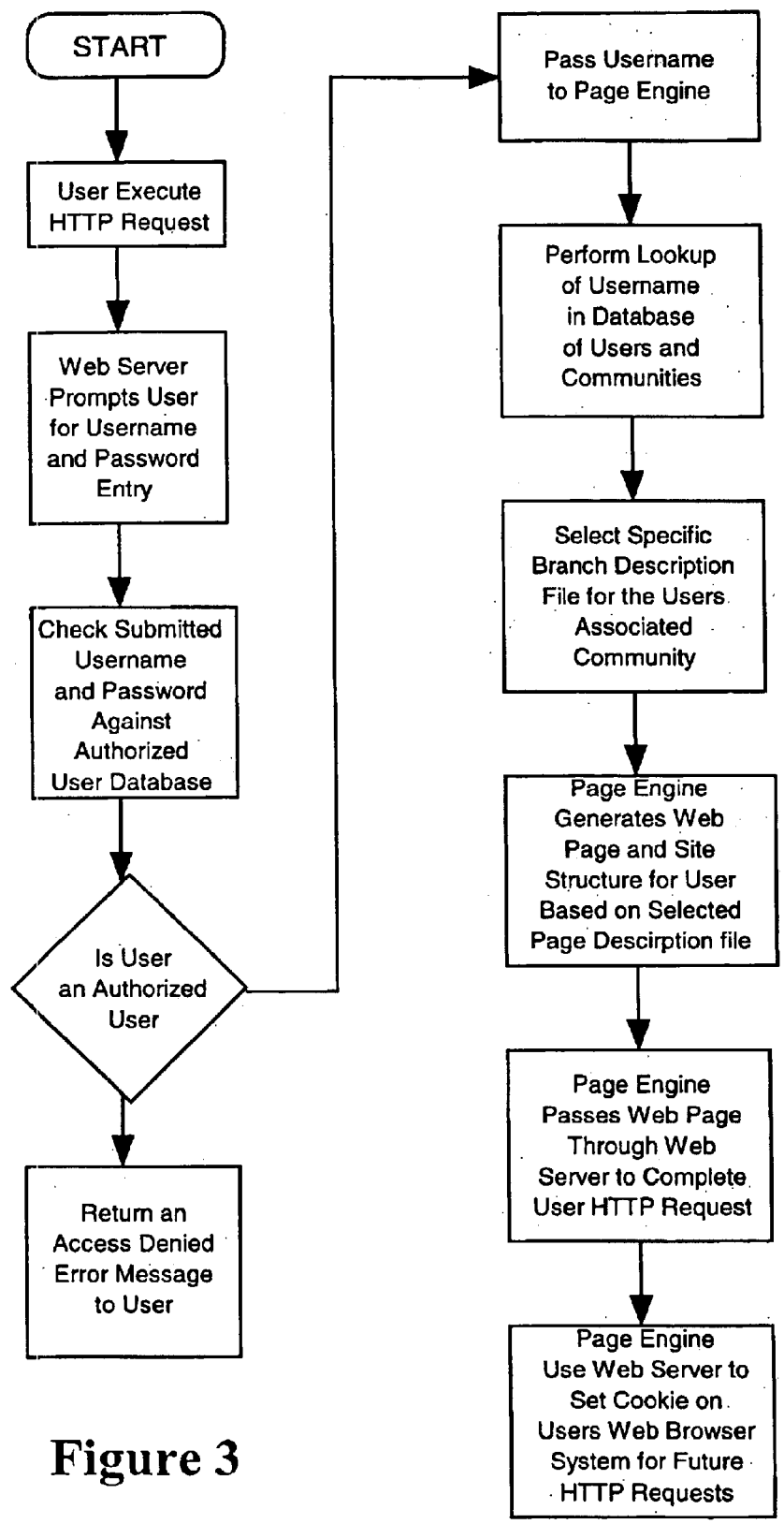
FIG. 3 is a flowchart of one embodiment of a method for generating a customized web site for an end user.

FIG. 3 is a flowchart of one embodiment of a method 400 according to the invention. The method 400 is initiated when a user executes an HTTP request (step 410) from the user's web browser 110. The request is sent to the web server 130, and the web server prompts the user for a username and password (step 415). After the user has responded to the request for username and password, the web server 130 performs a check on the user name and password against an authorized user database (step 420). If the web server 130 determines that the user is an authorized user (step 425), the username is passed to the page engine (step 435). If the user is not an authorized user, the web server 130 returns an access denied error message to the user's web browser (step 430) and the user is prevented from any further access to the web site at that time.

After the username is passed to the page engine 135 (step 435), the page engine 135 performs a lookup of the username in a database of users and user communities 140 to determine which user community the particular user is assigned to (step 440). A branch description file is then selected from among a number of branch description files corresponding to each of the predetermined user communities. The selected branch description file is associated with the user community to which the particular user is assigned (step 445). Each branch description file describes what portions of the overall web site may be accessed by users within a particular user community. The selected branch description file is then passed to the page engine 135 where it is used by the page engine 135 to generate a web page and associated web site structure for the particular user (step 450).

The page engine 135 then passes the generated web page through the web server 130 to complete the particular user's HTTP request (step 455). The page engine 135 then also uses the web server to place a cookie, a persistent data object, into the permanent storage of the user's web browser 110 (step 460) so that the user, the user community to which the user belongs, and the branch description file associated with that user community may be recognized immediately upon submission of further HTTP requests from that user.

The apparatus 100 and the method 400 described above enable a single web site to contain a variety of pages and to permit access by selected users to a select subset of those pages without the user also viewing links to pages for which they are not permitted access. In this way, several different customized web sites can be seamlessly generated for viewing by several different groups of users from one central store of web page content.

The steps of the method 400 can be implemented with hardware or by execution of programs, modules or scripts. The programs, modules or scripts can be stored or embodied on one or more computer readable mediums in a variety of formats, such as source code, object code or executable code, for example. The computer readable mediums may include, for example, both storage devices and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the described methods can be configured to access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for generating a web site, the system comprising:
   a web server to service HTTP requests received from users;
   a database connected to the web server, wherein the database determines which particular user community the requesting user is assigned to; and
   a dataset of stored branch description files describing particular web site structures to be used for each of the user communities, wherein the branch description file describes what portions of the web site can be accessed by users within a particular user community based on one of the users' geographic location, age, gender, corporate department and language.

2. The system of claim 1 further comprising:
   a page engine connected to the web server, wherein the page engine generates customized web sites for the requesting users.

3. The system of claim 1 further comprising:
   a dataset of web pages, wherein a subset of the web pages are selected to use in generating a customized web site for the user community to which the requesting user is assigned.

4. A method for generating a web site, the method comprising:
   assigning users to user communities based on characteristics selected from the group consisting of the users' age, gender, and language;
   accepting a HTTP request from a requesting user;
   directing a web server to prompt the requesting user to submit a username and a password;
   performing a lookup of the username in a database of user communities and usernames assigned to each user community; and selecting a branch description file specific to the user community to which the requesting user is assigned, wherein the branch description file describes what portions of the web site can be accessed by users within a particular user community.

5. The method of claim 4 further comprising:

comparing the submitted username and password against a database of authorized usernames and passwords;

passing an authorized user's username to a page engine for generation of a customized web site; and denying the requesting user access to the web server if the submitted username and password are not in the database of authorized usernames and passwords.

6. The method of claim 4 further comprising:

generating a customized web page and web site structure based upon the data contained in the branch description file selected for the user community to which the requesting user is assigned.

7. The method of claim 6 wherein the branch description file contains data which describes a subset of web pages to which the requesting user's user community has access.

8. The method of claim 6 further comprising:

transmitting the generated web page to the requesting user through the web server.

9. The method of claim 8 further comprising:

placing a persistent data object containing information about the branch description file and user community to which the requesting user is assigned.

10. A computer readable medium on which is embedded a program, the program comprising:

assigning users to user communities based on at least one of the users' geographic location, age, gender, corporate department and language;

accepting a HTTP request from a requesting user;

directing a web server to prompt the requesting user to submit a username and a password;

performing a lookup of the username in a database of user communities and usernames assigned to each user community; and selecting a branch description file specific to the user community to which the requesting user is assigned, wherein the branch description file describes what portions of the web site can be accessed by users within a particular user community.

11. The computer readable medium of claim 10 wherein the method further comprises:

comparing the submitted username and password against a database of authorized usernames and passwords;

passing an authorized user's username to a page engine for generation of a customized web site; and denying the requesting user access to the web server if the submitted username and password are not in the database of authorized usernames and passwords.

12. The computer readable medium of claim 10 wherein the method further comprises:

generating a customized web page and web site structure based upon the data contained in the branch description file selected for the user community to which the requesting user is assigned.

13. The computer readable medium of claim 12 wherein the branch description file contains data which describes a subset of web pages to which the requesting user's user community has access.

14. The computer readable medium of claim 12 wherein the method further comprises:

transmitting the generated web page to the requesting user through the web server.

15. The computer readable medium of claim 14 wherein the method further comprises:

placing a persistent data object containing information about the branch description file and user community to which the requesting user is assigned.

* * * * *